(12) United States Patent
Konishi

(10) Patent No.: US 8,618,494 B2
(45) Date of Patent: Dec. 31, 2013

(54) IMAGING APPARATUS, IMAGING CONTROL APPARATUS, IMAGING SYSTEM, AND METHOD FOR CONTROLLING IMAGING APPARATUS

(75) Inventor: Shimpei Konishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 13/398,654

(22) Filed: Feb. 16, 2012

(65) Prior Publication Data
US 2012/0217412 A1 Aug. 30, 2012

(30) Foreign Application Priority Data
Feb. 25, 2011 (JP) .................. 2011-040324

(51) Int. Cl.
*G01J 1/42* (2006.01)
(52) U.S. Cl.
USPC ........................................ 250/394

(58) Field of Classification Search
USPC ................ 250/394, 370.01–370.15; 378/98.8
See application file for complete search history.

(56) References Cited

U.S. PATENT DOCUMENTS

| 5,917,881 | A * | 6/1999 | Jeffery .......................... 378/98.8 |
| 7,593,508 | B2 | 9/2009 | Tsuchiya |
| 2010/0054624 | A1 | 3/2010 | Nishino et al. |

* cited by examiner

*Primary Examiner* — Kiho Kim
(74) *Attorney, Agent, or Firm* — Canon USA Inc. IP Division

(57) ABSTRACT

An imaging apparatus configured to output an imaging enabling signal in response to an imaging instruction includes an imaging unit, a control unit configured to cause the imaging unit to repeatedly perform initialization driving for reading an accumulated electrical signal, and a determination unit configured to determine whether to start new initialization driving before the imaging enabling signal is output, according to an elapsed time from completion of the last initialization driving to the time of receipt of the imaging instruction.

31 Claims, 8 Drawing Sheets

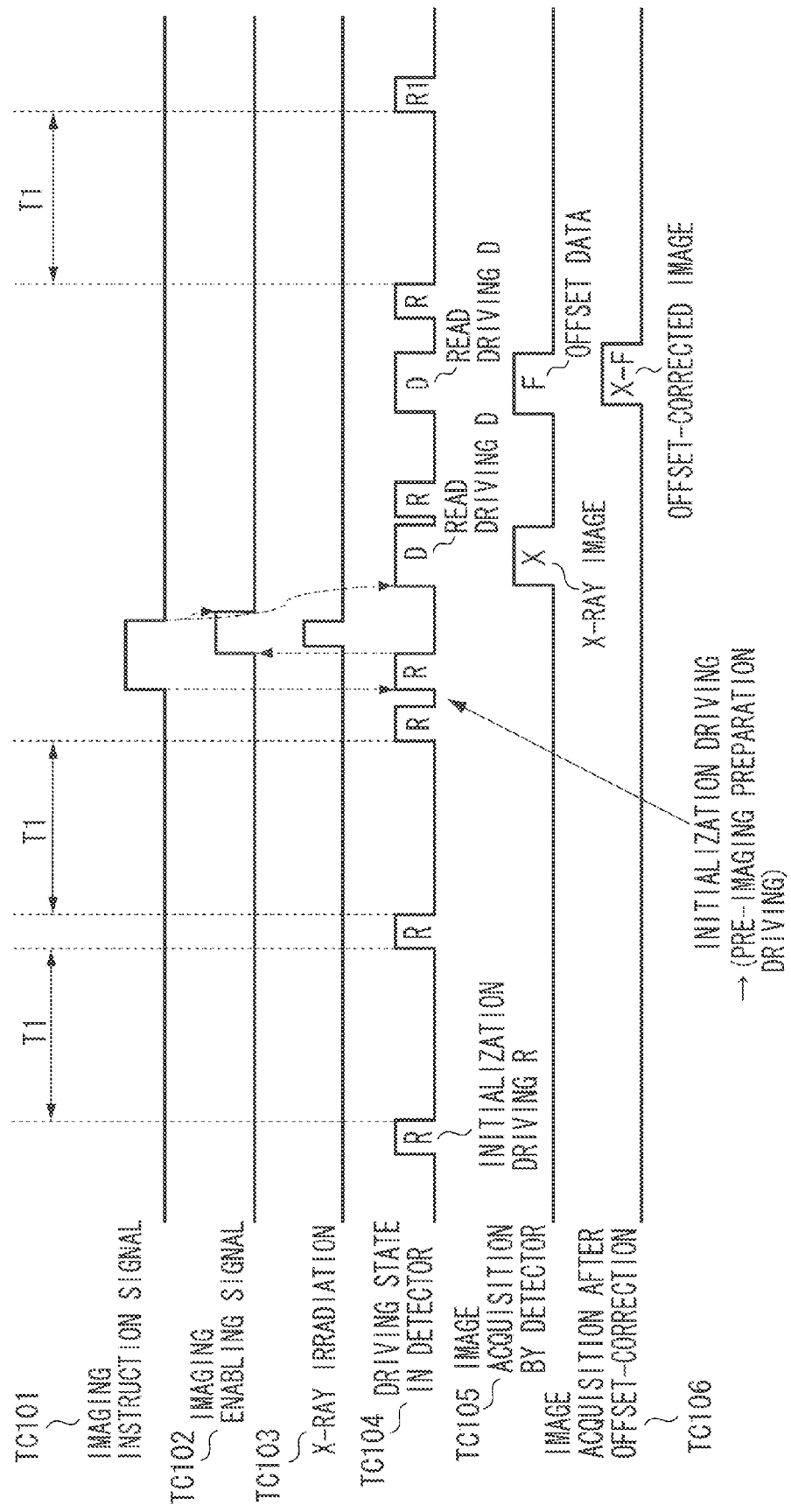

IMAGING APPARATUS, IMAGING CONTROL APPARATUS, IMAGING SYSTEM, AND METHOD FOR CONTROLLING IMAGING APPARATUS

TECHNICAL FIELD

The present disclosure relates to an imaging apparatus which outputs an imaging enabling signal in response to an imaging instruction, an imaging control apparatus, an imaging system, and a method for controlling the imaging apparatus.

BACKGROUND

In recent years, digital imaging apparatuses (flat panel detectors (FPDs)) which convert X-rays to electrical signals using an X-ray detector including a solid-state image sensor have become widely used to replace conventional film photographing apparatuses. Digital imaging apparatuses allow X-ray images to be easily handled as digital information. Thus, in terms of image processing, information sharing, management, and cost, for example, digital imaging apparatuses have great advantages over conventional film imaging apparatuses.

However, images captured by such imaging apparatuses contain offset noise. The offset noise is generated by a photoelectric conversion circuit and a read circuit. The offset noise is caused due to several factors, for example, a dark current in photoelectric conversion elements, a leak current in switching elements, and an offset voltage in amplifiers in the read circuit. Such offset noise is gradually accumulated with time when the imaging apparatus is kept in an imaging wait state.

U.S. Pat. No. 7,593,508 discusses a technique for reducing offset noise contained in an image by periodically performing initialization driving in which offset noise accumulated before imaging is read from an X-ray detector. U.S. Pat. No. 7,593,508 also discusses a technique in which X-ray imaging is performed after initialization driving is performed once again in response to an imaging instruction.

FIG. 8 is a timing chart illustrating a method for driving a exemplary X-ray imaging apparatus. Timing TC101 indicates an imaging instruction signal input to the X-ray imaging apparatus from an external unit. Timing TC102 indicates an imaging enabling signal output from the X-ray imaging apparatus. Timing TC103 indicates the timing of X-ray irradiation which is conducted in response to the imaging enabling signal. Timing TC104 indicates a driving state in an X-ray detector. Timing TC105 indicates the timing of acquisition of images from the X-ray detector. Timing TC106 indicates the timing of acquisition of an offset-corrected image.

As indicated by the timing TC104, during an imaging wait state, the X-ray detector repeatedly performs initialization driving R at fixed time intervals T1. In this state, upon receipt of the imaging instruction signal after the completion of initialization driving R, the X-ray detector performs pre-imaging initialization driving R. Then, the X-ray irradiation enabling signal is output to cause X-ray irradiation. After the X-ray irradiation is complete, the X-ray detector starts read driving D to read image signals.

On the condition that the image sensor repeatedly performs initialization which includes output of the offset noise data at certain intervals, if the imaging instruction signal is input within a sufficiently short period of time after the completion of the initialization, initialization does not need be performed again after the instruction signal is input.

SUMMARY

According to an aspect of the present embodiment, an imaging apparatus configured to output an imaging enabling signal in response to an imaging instruction includes an imaging unit, a control unit configured to cause the imaging unit to repeatedly perform initialization driving for reading an accumulated electrical signal, and a determination unit configured to determine whether to start new initialization driving before the imaging enabling signal is output, according to an elapsed time from completion of the last initialization driving to the time of receipt of the imaging instruction.

Further features and aspects will become apparent from the following detailed description of exemplary embodiments with reference to the attached drawings.

BRIEF DESCRIPTION OF THE DRAWINGS

The accompanying drawings, which are incorporated in and constitute a part of the specification, and illustrate exemplary embodiments and, together with the description, serve to explain the embodiments.

FIG. 8 is a timing chart illustrating a method for driving a conventional X-ray imaging apparatus.

DESCRIPTION OF THE EMBODIMENTS

Various exemplary embodiments will be described in detail below with reference to the drawings.

Figure 1:
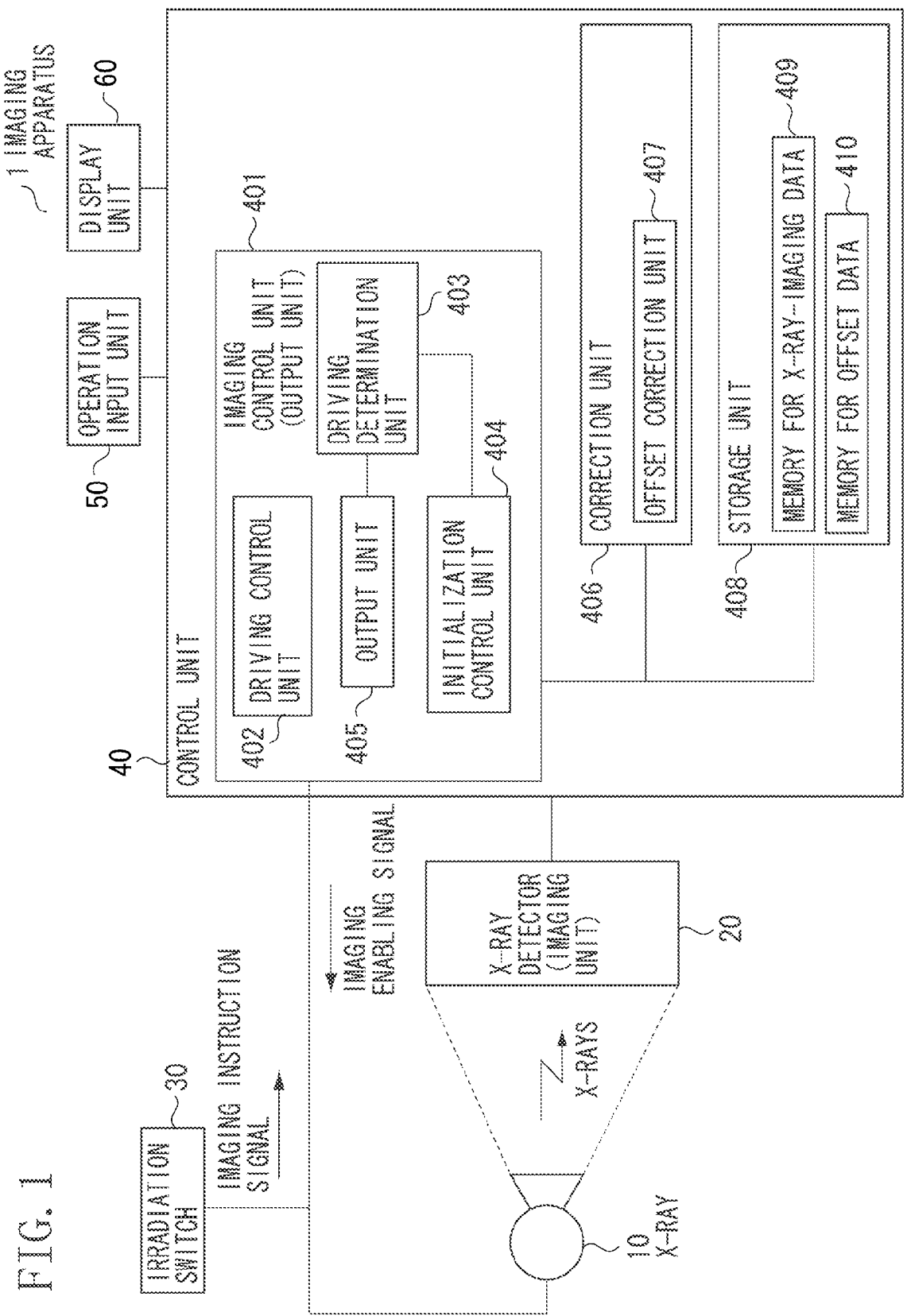
FIG. 1 is a block diagram schematically illustrating an example configuration of an X-ray imaging apparatus according to a first exemplary embodiment.

FIG. 1 is a block diagram illustrating an example configuration of a radiation imaging system according to a first exemplary embodiment. In the present exemplary embodiment, an X-ray imaging apparatus will be described by way of example. Alternatively, another embodiment is also applicable to an imaging apparatus of radiation other than X-rays.

The radiation imaging system according to the first exemplary embodiment includes an X-ray generation unit 10, an X-ray detector (imaging unit) 20, an irradiation switch 30, a control unit 40, an operation input unit 50, and a display unit 60. The control unit 40 and the X-ray detector (imaging unit) 20 constitute an imaging apparatus 1.

The control unit 40 includes an imaging control unit 401, a correction unit 406, and a storage unit 408. The imaging control unit 401 controls driving and imaging in the X-ray detector 20. The correction unit 406 performs signal processing such as offset correction. The storage unit 408 stores acquired images.

The imaging control unit 401 includes a driving control unit 402, a driving determination unit 403, an initialization control unit 404, and an output unit 405. The driving control unit 402 controls reading of image signals. The driving determination unit 403 determines whether to perform initialization driving. The initialization control unit 404 controls initialization driving in the imaging unit 20. The output unit 405 outputs an imaging enabling signal.

The correction unit 406 includes an offset correction unit 407. The offset correction unit 407 corrects an offset in X-ray image obtained by the X-ray detector (imaging unit) 20 by receiving radiation, based on offset data acquired by the X-ray detector 20 in a non-radiation-receiving state. The storage unit 408 includes a memory 409 for X-ray-imaging data and a memory 410 for offset data.

The X-ray generation unit 10 is capable of generating X-rays toward an object. The X-ray generation unit 10 includes an X-ray tube, and a control unit which controls the X-ray tube for generation of X-rays.

In the X-ray detector 20, thin film transistors (TFTs) and photoelectric conversion elements, for example, are arranged in a two-dimensional array, with each pair of a TFT and a photoelectric conversion element functioning as a pixel. On each pixel, a phosphor, for example, is provided. The phosphor converts X-rays entering the X-ray detector 20 into visible light. The visible light enters the photoelectric conversion element of each pixel. Consequently, electrical charge is generated in the photoelectric conversion elements.

Instead of providing the phosphor, so-called direct-conversion-type conversion elements, which directly convert incoming X-rays into electrical charge, may be included. As already described in the background section above, the X-ray detector 20 is capable of capturing an X-ray image and an offset data by repeating accumulation of electrical charge in, and reading of the electrical charge from, the conversion elements in an alternating manner.

The irradiation switch 30 is an operation unit which receives an operation giving an instruction to start imaging. In response to pressing of the irradiation switch 30 by a user, an imaging instruction signal is output. The control unit 40 receives the imaging instruction signal. In this respect, the control unit 40 functions as a receiving unit. In response to the imaging instruction signal, the control unit 40 outputs an imaging enabling signal to cause the X-ray generation unit 10 to generate X-rays.

The imaging instruction signal is a signal for requesting permission to conduct X-ray irradiation. However, the imaging instruction signal need not necessarily contain information that means an explicit imaging instruction or request for permission. The imaging instruction signal serves as a trigger for causing each unit in the system to start preparation for imaging in response to that signal. The imaging enabling signal is a signal by which the control unit 40 provides notification that the X-ray detector (imaging unit) 20 is ready for imaging. The imaging enabling signal does not need to contain information that means explicit permission for imaging. The imaging enabling signal functions as a trigger for starting X-ray irradiation.

The control unit 40 controls the entire imaging apparatus 1. Before imaging, the initialization control unit 404 in the control unit 40 controls the X-ray detector 20 to cause the X-ray detector 20 to perform initialization driving. In the initialization driving, to prevent photoelectric conversion elements 2001 in the X-ray detector 20 from becoming saturated, electrical signals (offset noise) are read which are accumulated with time in the circuit when the X-ray detector 20 is in the non-radiation-receiving state. By performing the initialization driving, the offset noise in the circuit is removed. The X-ray detector 20 repeatedly performs this initialization driving at predetermined time intervals, thereby periodically initializing electrical charge.

To perform imaging, the control unit 40 places the X-ray detector 20 in a state in which electrical charge is accumulated therein. The X-ray detector 20 in this state receives X-rays generated by the X-ray generation unit 10. The control unit 40 then controls the X-ray detector 20 to cause the X-ray detector 20 to perform read driving for reading image signals. As a result of such a series of imaging control operations, an X-ray image is obtained.

To capture an offset data, the X-ray detector 20 accumulates electrical charge without the X-ray generation unit 10 generating any X-rays. The control unit 40 then reads the electrical charge from the X-ray detector 20 to obtain an offset data.

In the description of the present exemplary embodiment, an electrical signal acquired by the X-ray detector 20 receiving X-rays is particularly referred to as an "image signal", as distinguished from an electrical signal indicating offset data.

The operation input unit 50 is operable by an operator to set patient information and imaging conditions in the X-ray imaging apparatus 1. The operator can control data transfer to and from the control unit 40 using the operation input unit 50, for example, by operating software included in a computer or other device, to set a portion to be captured and imaging conditions, for example.

Based on image data sent from the control unit 40 and the operation input unit 50, the display unit 60 displays, for example, an X-ray image based on electrical charge read from the X-ray detector 20, and an operation user interface (UI), which is operable via the operation input unit 50. The display unit 60 can display an offset-corrected radiation image according to control performed by the control unit 40.

Figure 2:
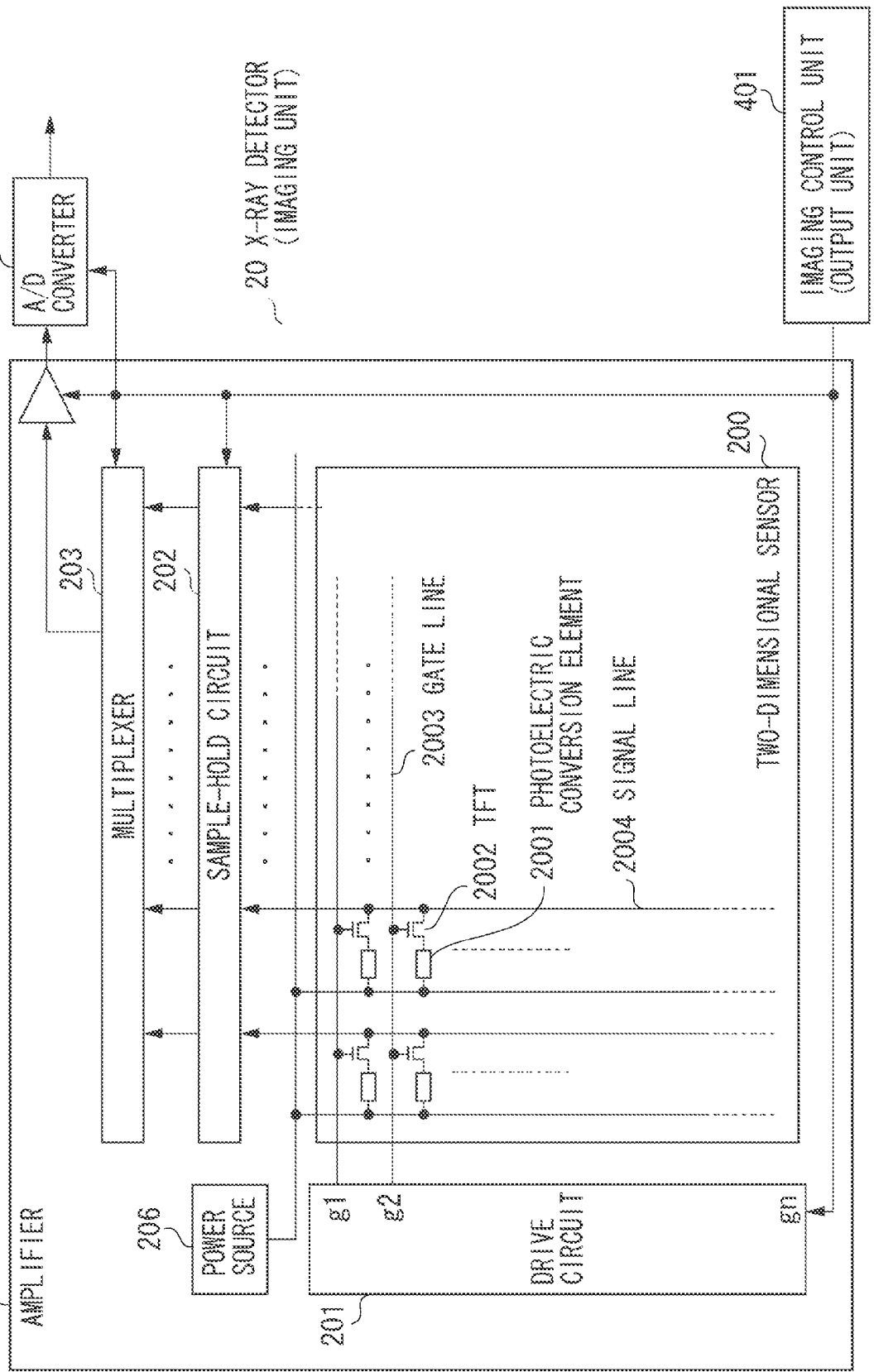
FIG. 2 schematically illustrates an example configuration of a two-dimensional sensor of an X-ray detector.

FIG. 2 illustrates an example configuration of the X-ray detector (imaging unit) 20. The X-ray detector 20 includes a two-dimensional sensor 200, a drive circuit 201, a sample-hold circuit 202, a multiplexer 203, an amplifier 204, an A/D converter 205, and a power source 206. In the two-dimensional sensor 200, pixels are arranged in a matrix. Each pixel includes a photoelectric conversion element 2001 and a TFT 2002. The two-dimensional sensor 200 further includes gate lines 2003, which are used to control an on/off state of the TFTs 2002, and signal lines 2004, which are used to read pixel signals.

The drive circuit 201 performs an addressing operation on the pixels in a row simultaneously. The sample-hold circuit 202 stores therein electrical charges on the respective pixels in the row. The stored pixel output charges are then sequentially read out via the multiplexer 203. The read charges are amplified by the amplifier 204 and then converted to digital values by the A/D converter 205. Each time the reading of a row is complete, the drive circuit 201 drives and reads the next row in the pixel array in sequence until all pixel output charges are converted to digital values. The imaging control unit 401 in the control unit 40 controls these driving, read, and other operations in the X-ray detector 20.

The image data converted to the digital values is stored in the X-ray-imaging data memory 409 illustrated in FIG. 1 if that image data is X-ray image data acquired by the X-ray detector 20 by receiving X-rays, or stored in the offset data memory 410 if that image data is offset data obtained by the X-ray detector 20 in the non-radiation-receiving state. The offset correction unit 407 then performs offset correction processing on the image.

An offset data set is acquired, for example, immediately after X-ray imaging to perform offset correction. However, an offset data may be acquired immediately before X-ray imaging. If variation in offset component is small, an offset data prepared beforehand may be used a number of times in offset correction processing.

Figure 3:
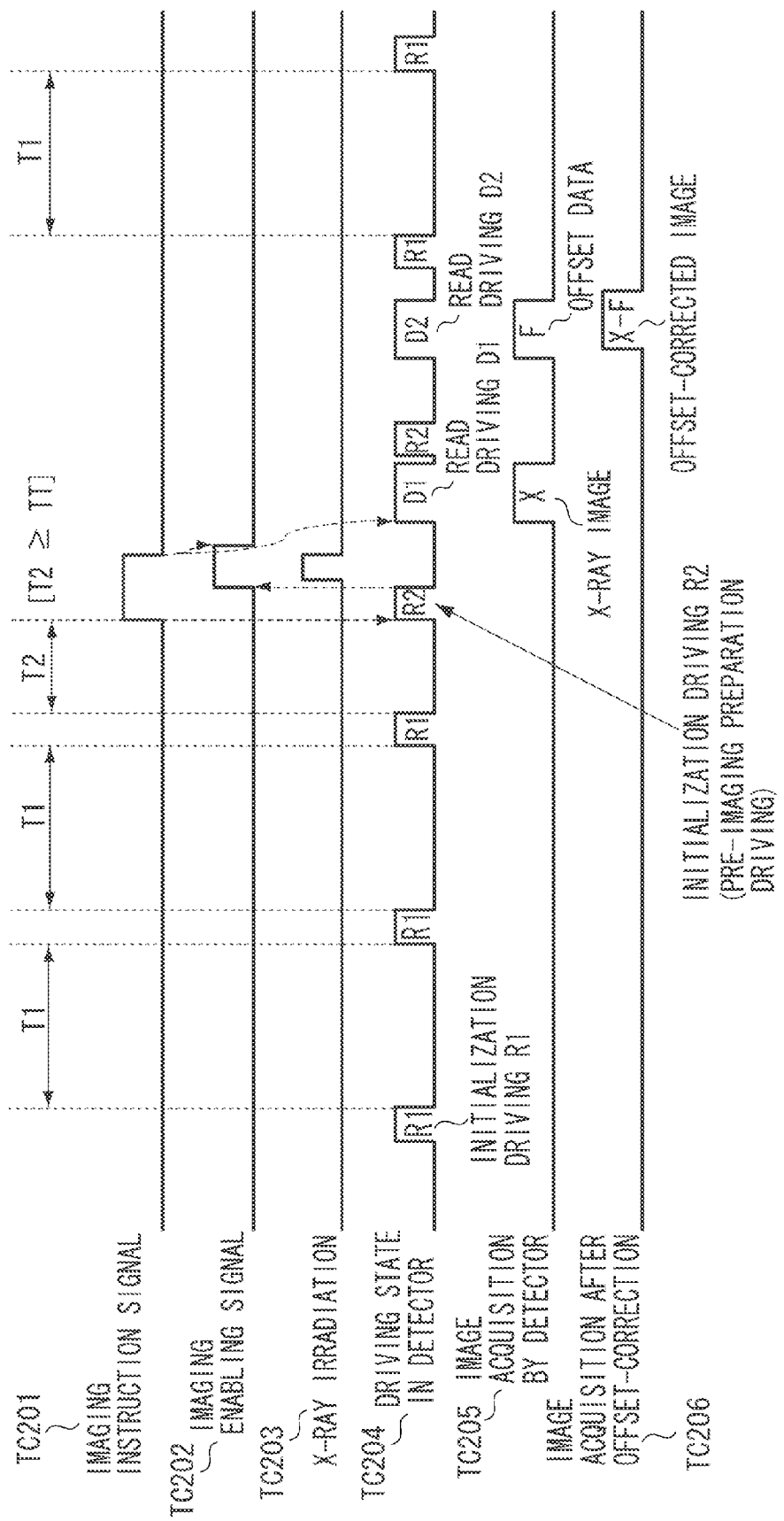
FIG. 3 is a timing chart illustrating imaging processing according to the first exemplary embodiment in which pre-imaging initialization driving is performed.

Referring to timing charts illustrated in FIGS. 3 and 4, processing in the imaging system having the above-described configuration will be described. In FIG. 3, timing TC201 indicates the timing of receipt of an imaging instruction signal in the control unit 40. Timing TC202 indicates the timing of output of an imaging enabling signal from the control unit 40. Timing TC203 indicates the timing of X-ray irradiation. Timing TC204 indicates a driving state in the X-ray detector 20. Timing TC205 indicates the timing of acquisition of images by the X-ray detector 20. Timing TC206 indicates the timing of acquisition of an offset-corrected image by the control unit 40.

Figure 4:
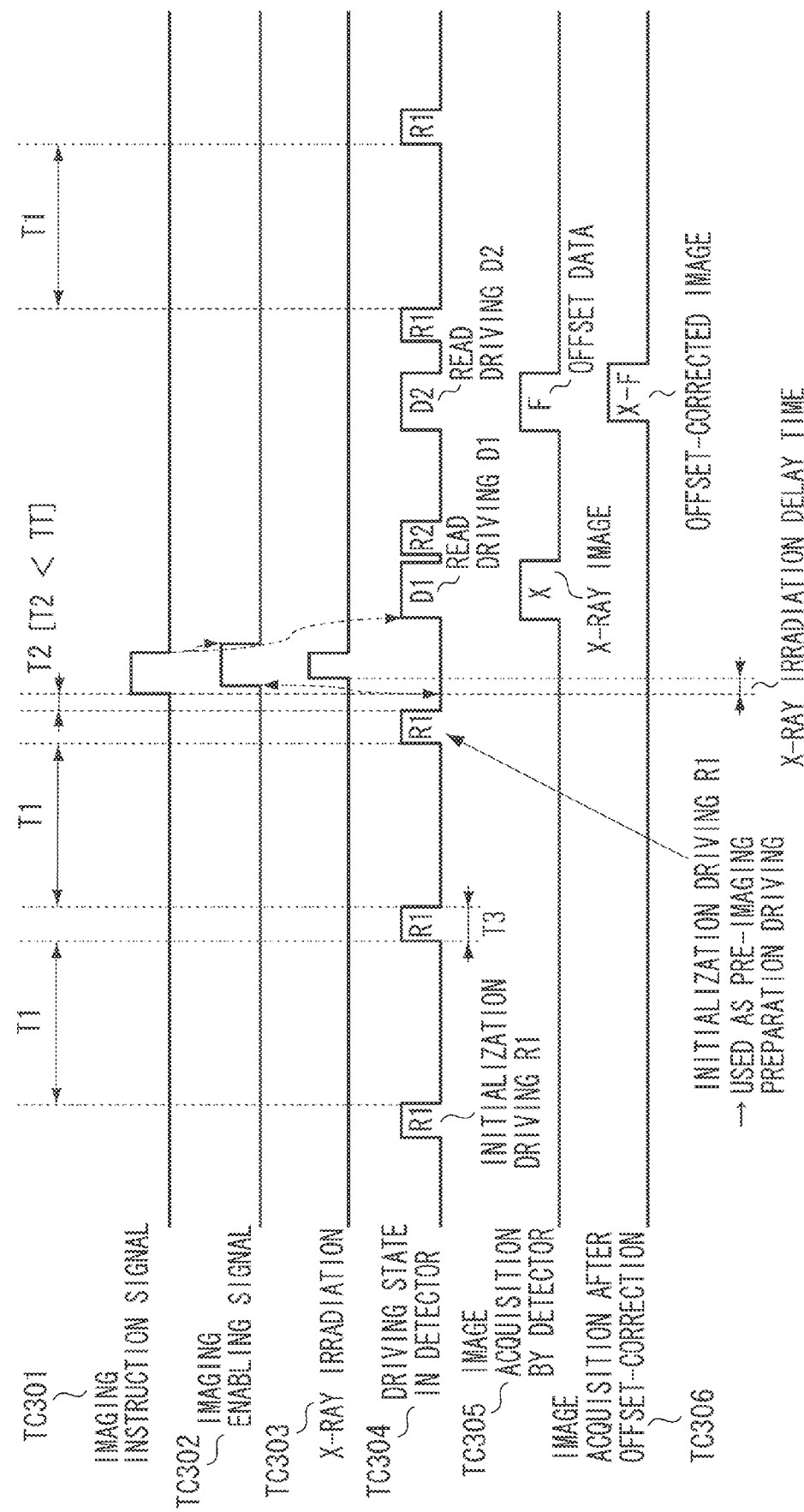
FIG. 4 is a timing chart illustrating imaging processing according to the first exemplary embodiment in which pre-imaging initialization driving is not performed.

In the timing chart illustrated in FIG. 4, timing TC301 to TC306 indicates the timing of the same signal or the like as the corresponding timing TC201 to TC206 illustrated in FIG. 3. FIG. 3 illustrates processing which is performed if an imaging instruction is provided after a predetermined period of time TT has elapsed since the completion of initialization driving. FIG. 4 illustrates processing which is performed if an imaging instruction is provided before the predetermined period of time TT has elapsed since the completion of initialization driving.

Upon determining that an imaging instruction has been given before the lapse of the predetermined period of time TT, the driving determination unit 403 determines that initialization driving which is to be performed after the receipt of the imaging instruction signal is not necessary. This is to reduce an X-ray irradiation delay time, which is the elapsed time from when a user presses the irradiation switch 30 to when X-ray irradiation is actually conducted. In this case, the control unit 40 performs the control illustrated in FIG. 4, so that the output unit 405 immediately outputs an imaging enabling signal to the X-ray generation unit 10. Thus, the X-ray irradiation delay is reduced.

Upon determining that an imaging instruction has been provided after the lapse of the predetermined period of time TT, the driving determination unit 403 determines that the initialization driving is necessary. In this case, the control unit 40 performs the control illustrated in FIG. 3. The initialization driving is conducted in response to the imaging instruction. The output unit 405 then outputs an imaging enabling signal. Thus, offset noise which would otherwise be contained in the image is removed to increase the image quality of the X-ray image.

Imaging processing will be described in detail. As illustrated in FIG. 3, when in the imaging wait state, the control unit 40 causes the initialization control unit 404 to periodically perform initialization driving R1 at predetermined initialization driving intervals T1 (as indicated by the timing TC204) to initialize electrical charge accumulated in the X-ray detector 20 due to dark current or other factors.

Individual initialization driving R1 is considered complete when the initialization control unit 404, which outputs an instruction to read an electrical signal from each pixel in the X-ray detector 20, has provided such electrical-signal-read instructions for all pixels. However, the timing of the completion of initialization driving is not limited to this. For thinning driving and partial driving in which only a subset of all pixels is used to generate an image, initialization driving may be considered complete when the initialization control unit 404 has provided electrical-signal-read instructions for those pixels used to generate the image. Alternatively, the control unit 40 may be notified of the completion of initialization driving at the time a determination is made that the discharge of electrical signals is complete in the X-ray detector 20.

When an operator operates the irradiation switch 30 to make a request for X-ray irradiation, an elapsed time T2 since the completion of the last initialization driving R1 is detected. Based on the elapsed time T2, the driving determination unit 403 determines whether to conduct initialization driving once again before imaging. If the driving determination unit 403 determines that initialization driving is necessary, the control unit 40 causes the initialization control unit 404 to perform initialization driving R2. After the completion of the initialization driving R2, the output unit 405 transmits an imaging enabling signal to the X-ray generation unit 10, thereby performing control for conducting X-ray irradiation.

The initialization driving R1 and R2 may be the same driving. In that case, the driving control in the imaging unit can be simplified. Alternatively, the initialization driving R2 may be performed in a shorter time than the initialization driving R1 by reducing the ON time of the TFTs 2002 therein. This reduces the delay time between the output of the imaging instruction signal and the start of the imaging.

In synchronization with the X-ray irradiation, the control unit 40 reads from the X-ray detector 20 the electrical charge based on X-rays that have passed through an object, to acquire an X-ray image. The control unit 40 causes the correction unit 406 to perform image processing, including offset correction processing, on the acquired image. The control unit 40 then causes the display unit 60 to display the resultant X-ray image.

When the driving determination unit 403 determines that the initialization driving is not necessary because the above-mentioned elapsed time T2 is shorter than the period of time TT, the output unit 405 transmits an imaging enabling signal to the X-ray generation unit 10 immediately after the receipt of the imaging instruction signal. As illustrated in FIG. 4, the initialization control unit 404 does not start new initialization driving until the reading of image signals is complete.

In the determination process, the driving determination unit 403 may compare the time interval T1 with the period of time TT to determine which is longer or shorter. Then, according to the determination result, the initialization control unit 404 and the imaging control unit 401 may determine subsequent driving and perform control.

Figure 5:
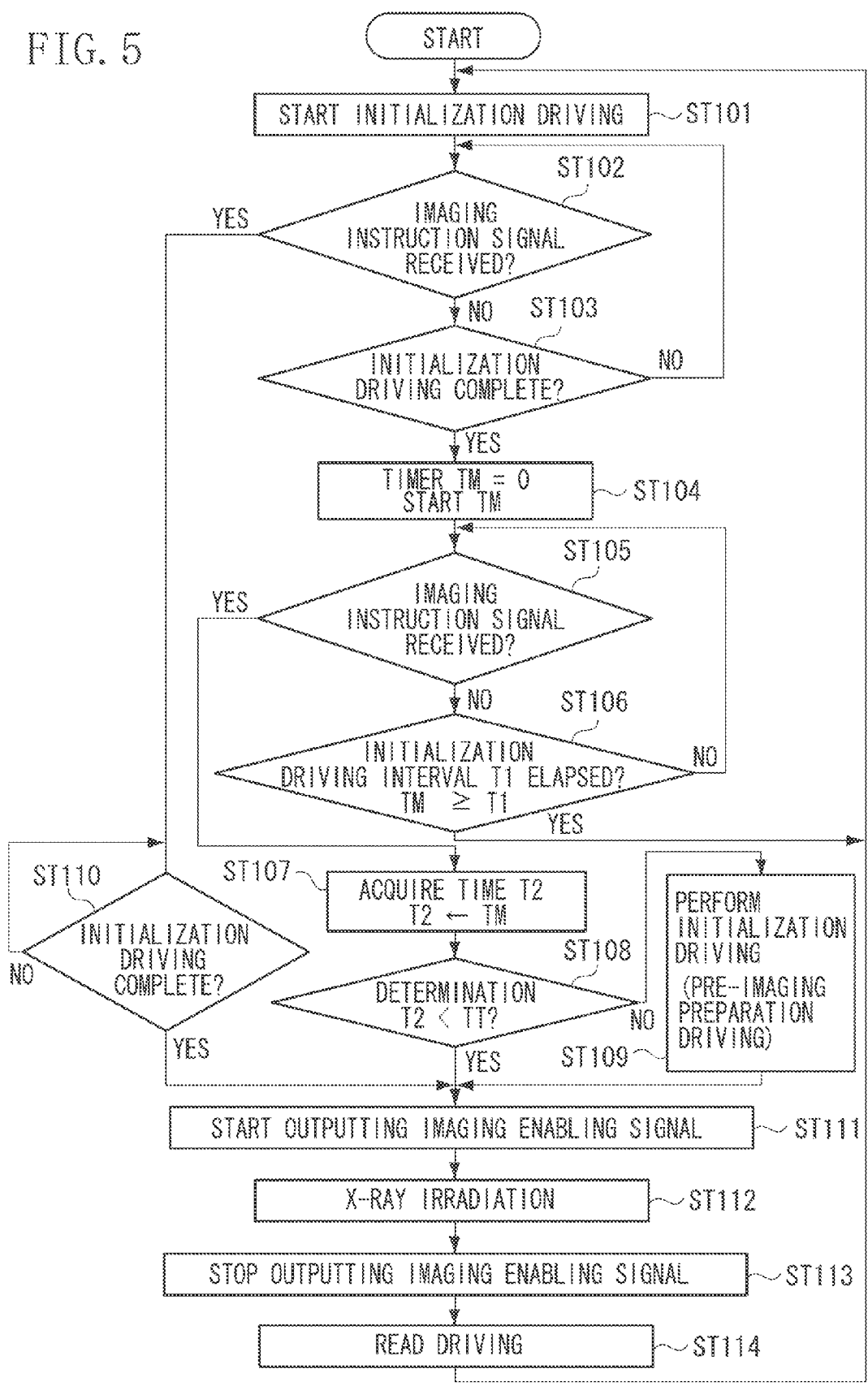
FIG. 5 is a flowchart schematically illustrating a flow of imaging processing according to the first exemplary embodiment.

With reference to FIG. 5, an example control procedure performed in the imaging system to accomplish the control illustrated in the above-discussed timing charts will be described.

In step ST101, the initialization control unit 404 in the control unit 40 in the imaging wait state starts initialization driving at the predetermined time intervals T1. Next, in step ST102, the imaging control unit 401 monitors whether an imaging instruction signal, which is output from the irradiation switch 30 when the irradiation switch 30 is pressed, has been received.

If the X-ray irradiation request signal is received during initialization driving (YES in step ST102), then in step ST110, the imaging control unit 401 waits until the initialization driving currently being performed is complete. In step ST111, the output unit 405 immediately starts outputting an imaging enabling signal to the X-ray generation unit 10. According to the process in step ST111, the imaging enabling signal continues to be output. In step ST112, in response to this, the X-ray generation unit 10 generates X-rays.

As described above, if the irradiation switch 30 is pressed while initialization driving is being performed, the output unit 405 outputs an imaging enabling signal immediately after that initialization driving is complete, to start imaging. This reduces the delay between the pressing of the irradiation switch 30 and the start of the imaging.

After the X-ray generation unit 10 generates X-rays for a predetermined period of time, a signal indicating the completion of the X-ray irradiation is input to the control unit 40. In response to this signal, in step ST113, the imaging control unit 401 stops outputting the imaging enabling signal. In step ST114, the driving control unit 402 causes read driving to be performed. In the read driving, image signals obtained based on the received X-rays are read from the X-ray detector 20.

If, in step ST102, the imaging control unit 401 determines that an imaging instruction signal has not been received (NO in step ST102), then in step ST103, the imaging control unit 401 determines whether the initialization driving is complete. If the initialization driving is not complete (NO in step ST103), the process returns to step ST102. The imaging control unit 401 makes a determination again whether an imaging instruction signal has been received, and whether the initialization driving is complete.

If the initialization driving is complete (YES in step ST103), then the imaging control unit 401 resets the value TM of a timer to 0 and starts the timer to measure an elapsed time from the completion of the initialization driving to the receipt of an X-ray irradiation request signal. In step ST104, in response to this start instruction, the timer in the imaging control unit 401 starts counting.

In steps ST105 and ST106, the imaging control unit 401 monitors whether an X-ray irradiation request signal is received before the value TM reaches or exceeds the initialization driving interval T1. In the present exemplary embodiment, if TM=T1, the process proceeds to step ST107. However, the process is not limited to this. When TM=T1, the process may return to step ST101.

If, in step ST106, the timer value TM has reached or exceeded the initialization driving interval T1 without receipt of an imaging instruction signal, the process returns to step ST101. Under the control of the initialization control unit 404, the X-ray detector 20 starts initialization driving again.

If an imaging instruction signal is received after the completion of initialization driving and before the start of the next initialization driving (YES in step ST105), then in step ST107, the imaging control unit 401 acquires the elapsed time T2 between the completion of the last initialization driving and the receipt of the imaging instruction signal by referring to the timer value TM. The last initialization driving as used herein means the initialization driving that has been last completed at the point of time the imaging instruction is received.

Then, in step ST108, the driving determination unit 403 compares the time T2 with the predetermined initialization driving determination time TT. If the driving determination unit 403 determines that the time T2 is shorter than the time TT (YES in step ST108), the imaging control unit 401 determines that new initialization driving is not necessary because the elapsed time since the last initialization driving is short. In step ST111, the output unit 405 immediately outputs an imaging enabling signal to the X-ray generation unit 10.

If the driving determination unit 403 determines that the time T2 is equal to or longer than the time TT (NO in step ST108), the imaging control unit 401 determines that new initialization driving needs to be performed before imaging because the elapsed time since the last initialization driving is long. In this case, the initialization control unit 404 causes the X-ray detector 20 to perform initialization driving. After the completion of the initialization driving, in step ST111, the output unit 405 outputs an imaging enabling signal to the X-ray generation unit 10.

As described above, if the elapsed time from the completion of the last initialization driving is short at the time of the receipt of the imaging instruction, then the driving determination unit 403 determines that initialization driving does not need to be performed again before imaging, and the output unit 405 immediately outputs the imaging enabling signal. This eliminates unnecessary initialization driving to thereby simplify the control operation, while reducing the delay time between the output of the imaging instruction and the start of the imaging.

If the elapsed time since the completion of the last initialization driving is long, initialization driving is started immediately after the receipt of the imaging instruction. After the initialization driving is complete, imaging is started. Consequently, offset noise contained in the image is reduced, thereby increasing the image quality.

In the foregoing first exemplary embodiment, if the elapsed time since the completion of the last initialization driving is shorter than a threshold at the time the imaging instruction is received, then the imaging enabling signal is immediately output, without performing new initialization driving, to start imaging. In a second exemplary embodiment, if the elapsed time is shorter than a threshold, the X-ray detector 20 outputs an imaging enabling signal after waiting the amount of time required for initialization driving from the time of the receipt of the imaging instruction. The configuration of an apparatus according to the second exemplary embodiment is similar to that described in the first exemplary embodiment, and thus, description thereof will not be repeated.

Figure 6:
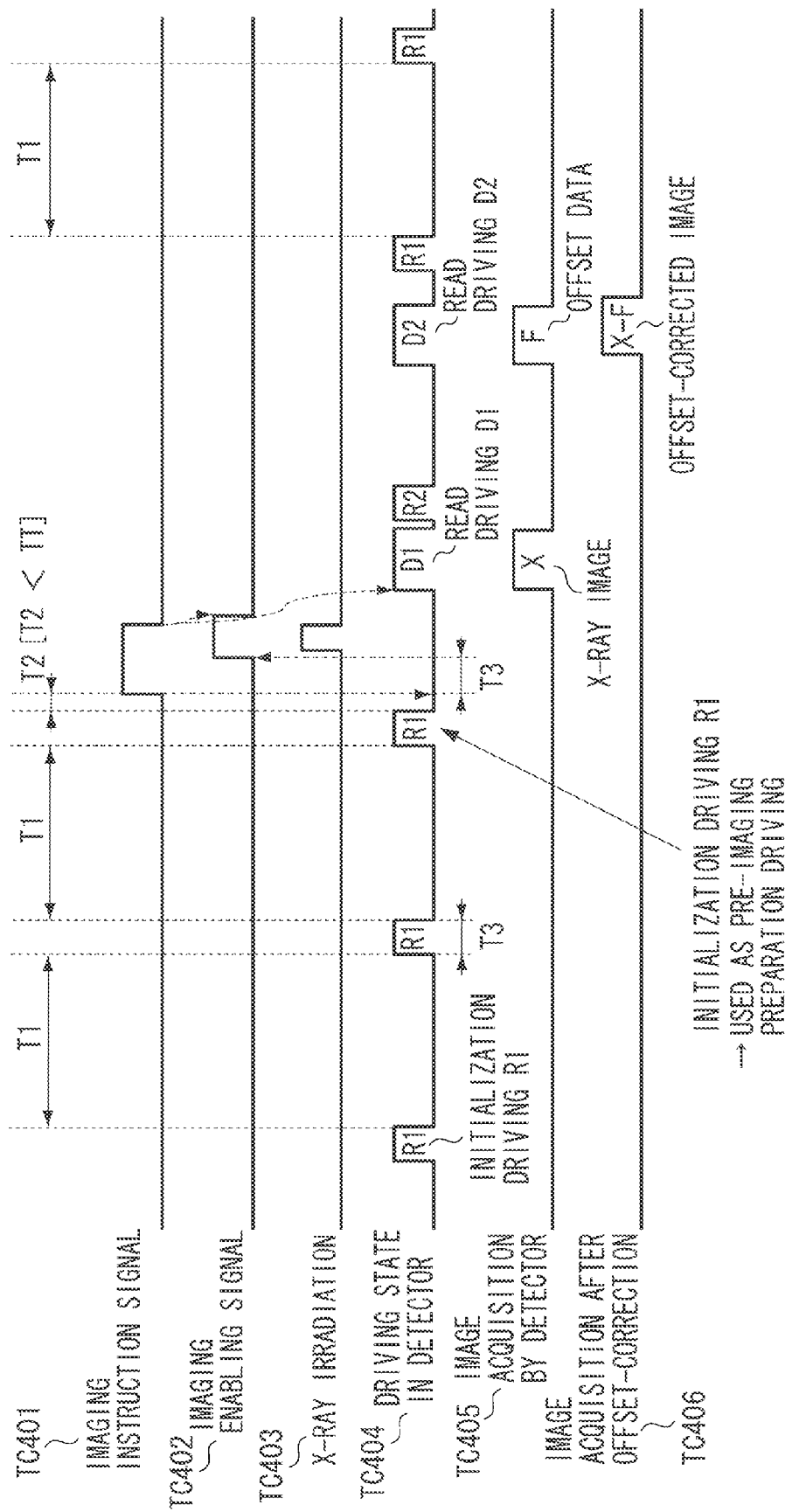
FIG. 6 is a timing chart schematically illustrating imaging processing according to a second exemplary embodiment.

Referring to a timing chart illustrated in FIG. 6, imaging processing implemented by the control unit 40 according to the present exemplary embodiment will be briefly described. Processing corresponding to that of the timing charts of FIGS. 3 and 4 discussed in the first exemplary embodiment will not be described in the present exemplary embodiment. Timing TC401 to TC406 in the timing chart indicates the timing of the same signal or the like as the corresponding timing TC201 to TC206 in FIG. 3.

FIG. 6 illustrates a case in which the control unit 40 receives an imaging instruction signal when a period of time T2 (<TT) has elapsed since the completion of initialization driving R1. If the driving determination unit 403 determines that the time period T2 is shorter than the initialization driving determination time TT, then the X-ray detector 20 waits a period of time T3 (as indicated by the timing TC404), and an imaging enabling signal is sent (as indicated by the timing TC402).

The time T3 is the elapsed time between the start and completion of the initialization driving R1. Assume a case in which the time T2 is equal to or longer than the time TT. In that case, an imaging enabling signal is sent after the initialization driving R1 is performed. Therefore, the time interval between the receipt of an imaging instruction and the output of an imaging enabling signal has a fixed duration, and is always the time T3 without being affected by the time period T2. This enables the time interval between the pressing of the irradiation switch 30 and the start of imaging to have a fixed duration without being affected by the timing of the imaging instruction.

Then, X-ray irradiation is conducted. The X-ray detector 20 performs read driving D1 for reading image signals to acquire an X-ray image. The X-ray detector 20 then performs initialization driving R2. After waiting a predetermined period of time in the non-radiation-receiving state, the X-ray detector 20 performs read driving D2 to acquire an offset data. This period of time during which the X-ray detector 20 waits is the time interval between the completion of the initialization driving R1 performed immediately before the imaging and the time of the read driving D1.

In this way, the length of the wait time before the X-ray image is captured is the same as that of the wait time before the offset data is acquired. As a result, the same amount of offset noise is accumulated in the imaging unit, enabling the offset data to be corrected and thus removed appropriately.

Figure 7:
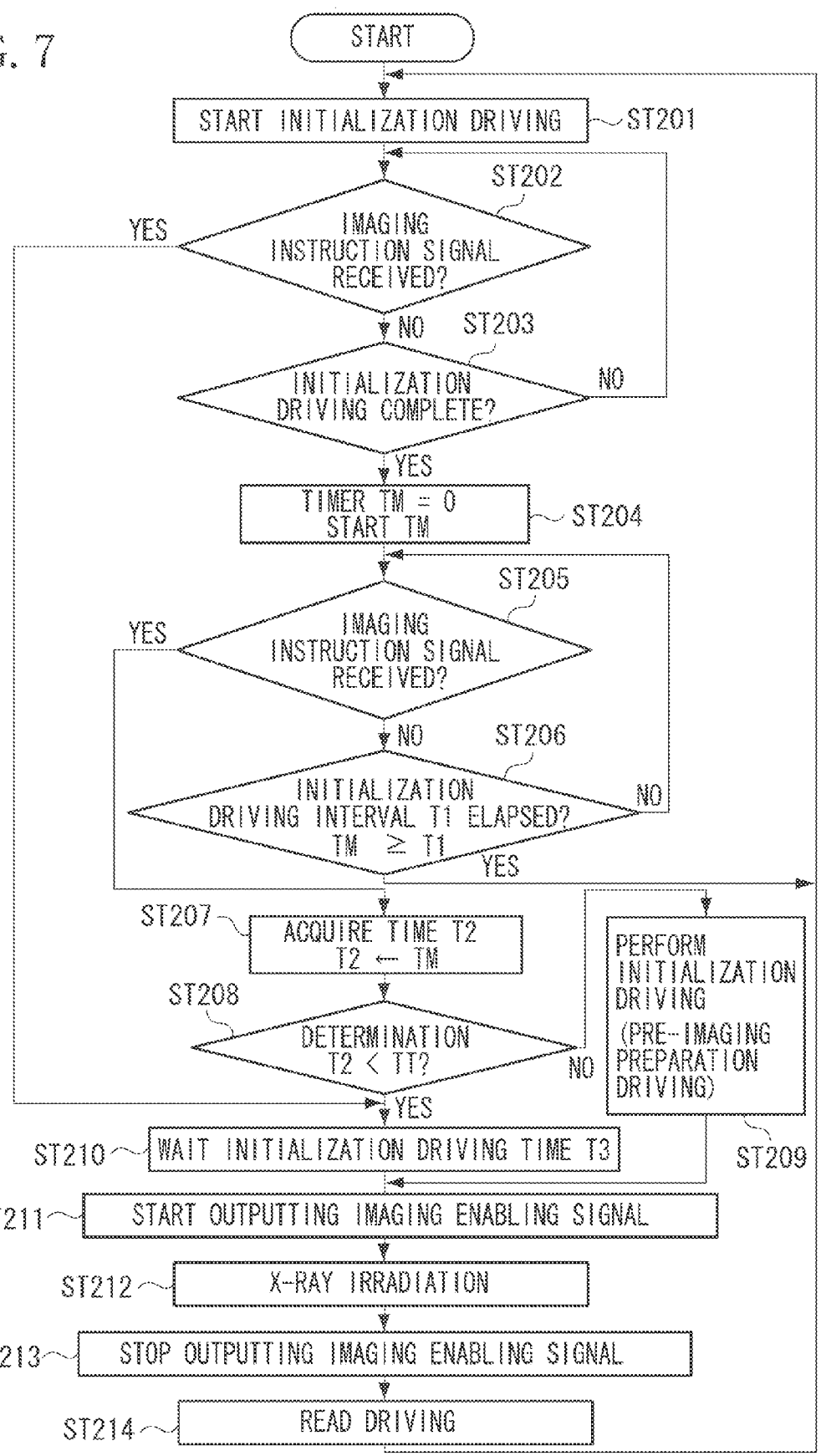
FIG. 7 is a flowchart schematically illustrating a flow of imaging processing according to the second exemplary embodiment.

Referring to a flowchart illustrated in FIG. 7, process steps for implementing the control in the above-discussed timing chart will be described. Processing corresponding to that of the flowchart of FIG. 5 described in the first exemplary embodiment will not be discussed in the present exemplary embodiment. Specifically, steps ST201 to ST209, which are similar to steps ST101 to ST109, will not be described.

If the imaging control unit 401 receives an imaging instruction signal during initialization driving (YES in step ST202), then in step ST210, the initialization control unit 404 performs control to continue the initialization driving currently being performed, while the imaging control unit 401 waits the period of time T3 required for the initialization driving. After the wait time has elapsed, the initialization driving has been complete.

After waiting the period of time T3, the output unit 405 outputs an imaging enabling signal. Specifically, in step ST211, the output unit 405 outputs an X-ray irradiation enabling signal to the X-ray generation unit 10. In step ST212, the X-ray generation unit 10 conducts X-ray irradiation. Subsequently, in step ST213, the output unit 405 stops outputting the X-ray irradiation enabling signal. In step ST214, the driving control unit 402 acquires an X-ray-imaging image.

The control performed in this manner enables the driving before imaging to be simplified, while reducing the number of driving operations in the imaging unit to thereby slow down the speed of deterioration thereof. In addition, the time interval between the time the control unit 40 receives an imaging instruction signal and the time the control unit 40 outputs an imaging enabling signal is not affected by the timing of the imaging instruction, and always has a fixed duration. Consequently, the time period between the pressing of the irradiation switch 30 by a user and the start of imaging always has a fixed duration. This increases the convenience of the imaging system.

The control according to the present exemplary embodiment also provides advantages in other respects. It is known that when X-ray imaging is performed after initialization driving is repeatedly conducted at short time intervals, a problem may arise, depending on the characteristics and state of the imaging unit, in that the stability of the sensor decreases to cause unnecessary noise to be introduced. Specifically, if the time intervals at which initialization driving is performed are shortened, offset noise having large pixel values is mixed in the image after the completion of initialization driving performed at such short time intervals. Thus, the offset noise may not be corrected appropriately.

This problem may occur in an imaging unit which includes photoelectric conversion elements of metal insulator semiconductor (MIS) type, for example. In an MIS imaging unit, refresh driving and dummy-read driving are each performed once as initialization driving. In the refresh driving, a voltage applied to photoelectric conversion elements 2001 is changed to discharge accumulated electrical charge. The dummy-read driving is similar to the image-signal read driving, but the ON time of TFTs 2002 is shorter in the dummy-read driving than in the image-signal read driving.

For such characteristics and state, if the control according to the present exemplary embodiment is performed, the time interval between the completion of the last initialization driving and the start of pre-imaging initialization driving is not affected by the timing of the receipt of an X-ray irradiation request signal from a user, and is equal to or longer than the initialization driving determination time TT. As a result, image noise caused by a short time interval between periodic initialization driving and pre-imaging initialization driving is prevented, while the time interval between the pressing of the irradiation switch by a user and the generation of X-rays always has a fixed duration.

In the foregoing exemplary embodiments, measurement of the time T2 is started at the point of time when initialization driving is complete. However, the measurement start time is not limited to this. Measurement may be started after a very short period of time has elapsed since the completion of initialization driving. The measured value is used to determine whether offset noise accumulated in the X-ray detector 20 exceeds an allowable value. The points of time when measurement of the time T2 is started and ended, and the duration of the threshold TT may be set as desired within the scope of this definition.

The initialization driving determination time TT may be changed according to a specific condition. For example, where the time TT is set to 0, new initialization driving is surely performed after the receipt of the imaging instruction signal in step ST105. The specific condition may be set as follows. For example, if the sensor has characteristics that vary according to the lapse of a predetermined period of time or the length of elapsed time since startup of the X-ray detector 20, the control unit 40 may increase the time TT according to the elapsed time since the startup. Then, noise can be reduced. Optionally, the imaging apparatus 1 may be configured so that if an instruction to surely perform initialization driving is received from the operation input unit 50, initialization driving is surely performed after the receipt of an imaging instruction signal.

In the foregoing exemplary embodiments, the initialization driving interval T1 is a fixed period of time. However, the interval T1 may be changed according to a specific condition. For example, the interval T1 may be kept at a small value within a predetermined period of time after startup of the imaging apparatus 1, and changed to a large value when the predetermined period of time or more has elapsed since the startup. Then, when the X-ray detector 20 behaves unstably immediately after the startup of the imaging apparatus 1, the interval T1 is set to a small value to perform initialization driving R1 at short time intervals, thereby enabling the X-ray detector 20 to behave stably.

Alternatively, the interval T1 may be kept at a small value within a predetermined period of time after the completion of X-ray irradiation and read driving, and changed to a large value when the predetermined period of time or more has elapsed after the imaging. This allows noise charge accumulated in the detector 20 due to the imaging to be removed early.

In the processing described above, considering a possible signal delay on a signal transmission path, the imaging control unit 401 may output an imaging enabling signal just before the time period T3 has elapsed. The wait processing during the time period T3 is provided taking user convenience into account. The length of the time period T3 may be changed to the extent that user discomfort is not caused.

As another exemplary embodiment, the control in the first and second exemplary embodiments may be adaptively selected. For example, the selection of whether to wait the initialization driving time T3 before outputting the imaging enabling signal may be made according to an input from a user. Thus, the selection of whether priority is given to reducing a delay time in imaging or to causing the time period between an imaging instruction and the start of imaging to have a fixed duration may be made according to a condition.

Furthermore, such selection may be made automatically according, for example, to an imaging condition, instead of an input from the user. For example, for imaging in which an object to be photographed does not move very much, and the time from an imaging instruction to the start of imaging does not matter, priority is given to the cycle time of the imaging, and the wait processing during the time period T3 is not performed. For angiographic photography or other imaging in which an object moves, the control for causing the time period between an imaging instruction and the start of imaging to have a fixed duration is employed. In this manner, if the control is changed according to conditions, the delay can be reduced, while the time period between an imaging instruction and the start of imaging can be of fixed duration.

As another example, the processing in the first and second exemplary embodiments may be used partially. For example, in the second exemplary embodiment, if an imaging instruction is received when initialization driving is not performed (YES in step ST205 in FIG. 7), and if the period of time TT has not elapsed since the last initialization driving (YES in step ST208), then the output unit 405 may output an imaging enabling signal without waiting until the time period T3 has elapsed. For example, the output unit 405 may output the imaging enabling signal at the point of time when half of the initialization driving time T3 has elapsed. If an imaging instruction is received during initialization driving (YES in step ST202), then in step ST210, the output unit 405 waits the initialization driving time T3, and then in step ST211, starts outputting an imaging enabling signal as in the second exemplary embodiment.

As a result, imaging does not start immediately after the irradiation switch 30 is pressed, thus causing a lag, while the wait time before the start of imaging is shortened to appropriately reduce the amount of offset noise. This causes the delay time to vary. However, if variation in the delay time is negligibly small to the user, the delay time variation does not decrease convenience. In addition, the image quality can be increased by appropriately reducing the amount of offset noise.

Each function block in the imaging system described above is implemented as a circuit. However, the exemplary embodiments are not limited to this. Part of the control may be achieved by a computer program and hardware that function collaboratively. Each circuit is not limited to units of function blocks, and only part of the functions may be implemented as a circuit.

In that case, an embodiment is realized as follows. A program for performing part or all of the control illustrated in FIG. 5 or 7 is stored in a storage unit. A central processing unit (CPU) (not illustrated) loads the program into a random access memory (RAM) and executes the program. In this case, the embodiment may also be realized by multiple distributed CPUs. Furthermore, the functions described above may be realized by processing performed by an operating system (OS) running on a computer, for example, and by processing performed by the program described above. The processing performed by the OS may be part or all of actual processing. In this case, the program is also within the scope of an embodiment. A recording medium on which the program or program code as software has been recorded is also recognized as being within the scope of an embodiment.

The control unit 40 may be disposed in an electronic cassette together with the X-ray detector 20, for example, or may be a function of a personal computer (PC) for controlling the electronic cassette. The control unit 40 may be a control system composed of multiple devices. For example, the functions of the control unit 40 may be partially performed by a circuit in the electronic cassette, and partially achieved by software in the PC. In that case, the imaging apparatus 1 may be an imaging system composed of multiple devices. The control unit 40 may be a standalone imaging control apparatus.

According to the forgoing exemplary embodiments, control can be simplified, while noise contained in an image can be reduced.

An embodiment can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the disclosure has been described with reference to exemplary embodiments, it is to be understood that an embodiment is not limited to the disclosed exemplary embodiments. The scope of the following claims is to be accorded the broadest interpretation so as to encompass all modifications, equivalent structures, and functions.

This application claims priority from Japanese Patent Application No. 2011-040324 filed Feb. 25, 2011, which is hereby incorporated by reference herein in its entirety.

What is claimed is:

1. An imaging apparatus for outputting an imaging enabling signal in response to an imaging instruction, the imaging apparatus comprising:
   an imaging unit;
   a control unit configured to cause the imaging unit to repeatedly perform initialization driving for reading an accumulated electrical signal; and
   a determination unit configured to determine whether to start new initialization driving before the imaging enabling signal is output, according to an elapsed time from completion of the last initialization driving to the time of receipt of the imaging instruction.

2. The imaging apparatus according to claim 1, further comprising an output unit configured to, if the determination unit determines to start the new initialization driving, output the imaging enabling signal in response to completion of the new initialization driving, and, if the determination unit determines not to start the new initialization driving, output the imaging enabling signal without causing the imaging unit to start the new initialization driving.

3. The imaging apparatus according to claim 2, wherein, if the determination unit determines not to start the new initialization driving, the output unit outputs the imaging enabling signal according to a lapse of a period of time required for the initialization driving performed by the imaging unit from the time of receipt of the imaging instruction.

4. The imaging apparatus according to claim 2, wherein, if the determination unit determines not to start the new initialization driving, the output unit immediately outputs the imaging enabling signal.

5. The imaging apparatus according to claim 1, wherein, if the determination unit determines that the elapsed time from the completion of the last initialization driving is shorter than a threshold, the control unit does not start new initialization driving until reading of an image signal is complete.

6. The imaging apparatus according to claim 5, further comprising a setting unit configured to set the threshold according to an elapsed time from startup of the imaging unit.

7. The imaging apparatus according to claim 1, wherein the imaging unit receives radiation emitted in response to the imaging enabling signal, to accumulate an electrical signal, and
wherein the control unit causes the imaging unit to perform driving for reading the electrical signal.

8. The imaging apparatus according to claim 1, wherein the initialization driving performed by the imaging unit is driving for reading an electrical signal that is not used to generate an image and that is accumulated in the imaging unit in a non-radiation-receiving state in which the imaging unit does not receive radiation.

9. The imaging apparatus according to claim 1, further comprising a receiving unit configured to receive a signal from an operation unit configured to receive an operation providing an instruction to perform imaging.

10. The imaging apparatus according to claim 1, wherein the control unit controls, after reading an electrical signal accumulated according to receipt of radiation, the imaging unit to accumulate an electrical signal in a non-radiation-receiving state, in which the imaging unit does not receive radiation, for a period of time between the completion of the last initialization driving and the start of reading of the electrical signal accumulated according to the receipt of radiation, reads the electrical signal accumulated in the non-radiation-receiving state to acquire an offset data, and stores the offset data in a storage unit.

11. The imaging apparatus according to claim 1, wherein the determination unit determines whether the elapsed time from the completion of the last initialization driving to the time of receipt of the imaging instruction exceeds a threshold.

12. The imaging apparatus according to claim 1, wherein the control unit is configured to cause the imaging unit to start the new initialization driving in response to the receipt of the imaging instruction.

13. The imaging apparatus according to claim 12, wherein the control unit is configured to cause the imaging unit to start the new initialization driving immediately after the receipt of the imaging instruction.

14. An imaging control apparatus configured to control an imaging unit and to output an imaging enabling signal in response to an imaging instruction, the imaging control apparatus comprising:
a control unit configured to cause the imaging unit to repeatedly perform initialization driving for reading an accumulated electrical signal; and
a determination unit configured to determine whether to start new initialization driving before the imaging enabling signal is output, according to an elapsed time from completion of the last initialization driving to the time of receipt of the imaging instruction.

15. An imaging system comprising:
the imaging control apparatus according to claim 14;
the imaging unit; and
a display unit configured to display an image acquired by the imaging unit.

16. A method for controlling an imaging apparatus configured to output an imaging enabling signal in response to an imaging instruction, the method comprising:
causing an imaging unit of the imaging apparatus to repeatedly perform initialization driving for reading an accumulated electrical signal; and
determining whether to start new initialization driving before the imaging enabling signal is output, according to an elapsed time from completion of the last initialization driving to the time of receipt of the imaging instruction.

17. An imaging control apparatus configured to control an imaging unit and to output an imaging enabling signal in response to an imaging instruction, the imaging control apparatus comprising:
a control unit configured to cause the imaging unit to repeatedly perform initialization driving for reading an accumulated electrical signal; and
a determination unit configured to determine whether to start new initialization driving in response to the receipt of the imaging instruction before the imaging enabling signal is output, according to an elapsed time from completion of the last initialization driving.

18. The imaging apparatus according to claim 17, wherein the control unit is configured to cause the imaging unit to start the new initialization driving immediately after the receipt of the imaging instruction.

19. The imaging apparatus according to claim 18, further comprising an output unit configured to output the imaging enabling signal immediately after the completion of the new initialization driving.

20. The imaging apparatus according to claim 17, further comprising an output unit configured to, if the determination unit determines to start the new initialization driving, output the imaging enabling signal in response to completion of the new initialization driving, and, if the determination unit determines not to start the new initialization driving, output the imaging enabling signal without causing the imaging unit to start the new initialization driving.

21. The imaging apparatus according to claim 20, wherein, if the determination unit determines not to start the new initialization driving, the output unit outputs the imaging enabling signal according to a lapse of a period of time required for the initialization driving performed by the imaging unit from the time of receipt of the imaging instruction.

22. The imaging apparatus according to claim 20, wherein, if the determination unit determines not to start the new initialization driving, the output unit immediately outputs the imaging enabling signal.

23. The imaging apparatus according to claim 17, wherein, if the determination unit determines that the elapsed time from the completion of the last initialization driving is shorter than a threshold, the control unit does not start new initialization driving until reading of an image signal is complete.

24. The imaging apparatus according to claim 23, further comprising a setting unit configured to set the threshold according to an elapsed time from startup of the imaging unit.

25. The imaging apparatus according to claim 17, wherein the imaging unit receives radiation emitted in response to the imaging enabling signal, to accumulate an electrical signal, and
wherein the control unit causes the imaging unit to perform driving for reading the electrical signal.

26. The imaging apparatus according to claim 17, wherein the initialization driving performed by the imaging unit is driving for reading an electrical signal that is not used to generate an image and that is accumulated in the imaging unit in a non-radiation- receiving state in which the imaging unit does not receive radiation.

27. The imaging apparatus according to claim 17, further comprising a receiving unit configured to receive a signal from an operation unit configured to receive an operation providing an instruction to perform imaging.

28. The imaging apparatus according to claim 17, wherein the control unit controls, after reading an electrical signal accumulated according to receipt of radiation, the imaging unit to accumulate an electrical signal in a non-radiation-receiving state, in which the imaging unit does not receive radiation, for a period of time between the completion of the last initialization driving and the start of reading of the electrical signal accumulated according to the receipt of radiation, reads the electrical signal accumulated in the non-radiation-receiving state to acquire an offset data, and stores the offset data in a storage unit.

29. The imaging apparatus according to claim 17, wherein the determination unit determines whether the elapsed time from the completion of the last initialization driving to the time of receipt of the imaging instruction exceeds a threshold.

30. An imaging system comprising:
the imaging control apparatus according to claim 17;
the imaging unit; and
a display unit configured to display an image acquired by the imaging unit.

31. A method for controlling an imaging apparatus configured to output an imaging enabling signal in response to an imaging instruction, the method comprising:
controlling an imaging unit to repeatedly perform initialization driving for reading an accumulated electrical signal;
determining whether to start new initialization driving in response to the receipt of the imaging instruction before the imaging enabling signal is output, according to an elapsed time from completion of the last initialization driving.

\* \* \* \* \*